(12) United States Patent
Choi et al.

(10) Patent No.: US 9,434,110 B2
(45) Date of Patent: Sep. 6, 2016

(54) METHOD OF MANUFACTURING UNEVENNESS SHAPED Z-PIN AND Z-PIN MANUFACTURED USING THE SAME AND COMPOSITE STRUCTURE INCLUDING THE Z-PIN

(71) Applicant: Korea Aerospace Research Institute, Daejeon (KR)

(72) Inventors: Ik Hyeon Choi, Daejeon (KR); Cheol Ho Lim, Daejeon (KR); Eun Sup Sim, Nonsan-si (KR)

(73) Assignee: KOREA AEROSPACE RESEARCH INSTITUTE (KR)

( * ) Notice: Subject to any disclaimer, the term of this patent is extended or adjusted under 35 U.S.C. 154(b) by 343 days.

(21) Appl. No.: 14/086,161

(22) Filed: Nov. 21, 2013

(65) Prior Publication Data

US 2015/0024203 A1 Jan. 22, 2015

(30) Foreign Application Priority Data

Jul. 17, 2013 (KR) .......................... 10-2013-0083925

(51) Int. Cl.
*B29C 70/24* (2006.01)
*B29C 37/00* (2006.01)

(52) U.S. Cl.
CPC ........... *B29C 70/24* (2013.01); *B29C 37/0082* (2013.01); *Y10T 29/49* (2015.01); *Y10T 428/2976* (2015.01)

(58) Field of Classification Search
CPC ...... B21D 28/04; B21D 28/10; B21D 28/12; B21D 28/125; B21D 35/001; B21D 53/42; B21D 53/36; B21D 13/04; B21D 13/08; B21D 13/10; Y10T 29/22; Y10T 29/207; Y10T 29/19; Y10T 29/16; Y10T 29/5147; Y10T 29/5148; Y10T 29/5149; Y10T 29/515; Y10T 29/5197; Y10T 29/5198

See application file for complete search history.

(56) References Cited

U.S. PATENT DOCUMENTS

| 185,836 A | * | 1/1877 | Robison ................ B21D 13/04 |
| | | | 470/89 |
| 4,808,461 A | | 2/1989 | Boyce et al. |
| 5,186,776 A | | 2/1993 | Boyce et al. |
| 5,589,015 A | | 12/1996 | Fusco et al. |
| 5,667,859 A | | 9/1997 | Boyce et al. |
| 5,800,672 A | | 9/1998 | Boyce et al. |
| 5,919,413 A | | 7/1999 | Avila |

(Continued)

FOREIGN PATENT DOCUMENTS

| JP | 2009085451 | 4/2009 |
| KR | 100892814 | 4/2009 |
| KR | 100932302 | 12/2009 |
| KR | 1020130038139 | 4/2013 |

OTHER PUBLICATIONS

Ik-Hyeon Choi et al., Improvement of joint strength of Co-cured Composite Structures Using Z-pining Patch, Collected Papers of Autumn Conference, 2012.

*Primary Examiner* — Jason L Vaughan
(74) *Attorney, Agent, or Firm* — Cantor Colburn LLP

(57) ABSTRACT

Provided are a method of manufacturing a Z-pin having an unevenness shape formed on a surface thereof so as to economically and effectively increase coupling force in the Z-pin for coupling of a composite material laminated structure in a laminated direction, and a Z-pin manufactured using the same and a composite structure including the Z-pin.

6 Claims, 11 Drawing Sheets

(56) References Cited

U.S. PATENT DOCUMENTS

| | | |
|---|---|---|
| 6,190,602 B1 | 2/2001 | Blaney et al. |
| 6,291,049 B1 | 9/2001 | Kunkel et al. |
| 6,405,417 B1 | 6/2002 | Sheehan et al. |
| 6,436,507 B1 | 8/2002 | Pannell |

* cited by examiner

METHOD OF MANUFACTURING UNEVENNESS SHAPED Z-PIN AND Z-PIN MANUFACTURED USING THE SAME AND COMPOSITE STRUCTURE INCLUDING THE Z-PIN

CROSS-REFERENCE TO RELATED APPLICATIONS

This application claims priority under 35 U.S.C. §119 to Korean Patent Application No. 10-2013-0083925, filed on Jul. 17, 2013, in the Korean Intellectual Property Office, the disclosure of which is incorporated herein by reference in its entirety.

TECHNICAL FIELD

The following disclosure relates to a method of manufacturing an unevenness shaped Z-pin, a Z-pin manufactured using the same and a composite structure including the Z-pin.

A fiber reinforced composite material mainly used in a lightweight structure such as an aerospace and transport mechanism structure member, or the like, is mainly prepared by laminating woven prepregs in one direction and performing a forming process of applying heat and pressure to the prepregs. Since the composite material laminated structure formed as described above does not include a separate reinforcing material in a thickness direction, an interlayer separation phenomenon that layers are separated from each other is easily generated due to external impact, or the like. Since the interlayer separation decreases strength of the structure, many researches into a method for preventing the interlayer separation have been conducted by researchers of the related field. When a structural problem of a thin plate is analyzed, a thickness direction of the plate is generally defined as a Z-axis among three coordinate axes, that is, X, Y, and Z axes. In order to reinforce a vulnerable interlayer separation feature of the composite material laminated structure, many researches into a method such as stitching, Z-pinning, textile, toughened matrix, or the like, have been conducted. A 'Z-pinning technology' is a term commonly indicating a technology of inserting a pin in a thickness direction in the related field as described above. More specifically, the 'Z-pinning technology' indicates a technology of inserting the pin in the thickness direction of the composite material laminated structure to reinforce vulnerable interlayer performance of the composite material laminated structure or inserting the pin in the thickness direction when a plurality of laminated members contact each other and are connected to each other to improve connection performance between the laminated members.

BACKGROUND

Among researches for improving interlayer performance of a composite material laminated structure or connection performance between at least two composite material laminated structures, a research into a Z-pinning technology has relatively recently started. Known technologies for the Z-pinning will be schematically described below.

A concept of a Z-pinning method has been first suggested in U.S. Pat. No. 4,808,461 (1989), a concept of inserting a pin by adding an ultrasonic vibration load has been suggested in U.S. Pat. No. 5,186,776 (1993), and a concept of manufacturing a Z-pinning composite material structure using an ultrasonic gun and a compressible foam into which a pin is inserted has been suggested in U.S. Pat. No. 5,589,015 (1996). Then, a Z-pinning concept has been developed in U.S. Pat. No. 5,667,859 (1997), U.S. Pat. No. 5,800,672 (1998), U.S. Pat. No. 5,919,413 (1999), U.S. Pat. No. 6,190,602 (2001), U.S. Pat. No. 6,291,049 (2001), U.S. Pat. No. 6,405,417 (2002), U.S. Pat. No. 6,436,507 (2002), and the like. However, in these patents, a compressible foam has been continuously used.

In Korea, a Z-pinning method that does not use the compressible foam described above has been suggested by the present applicant in Korea Patent No. 0932302 (Dec. 8, 2009) entitled "Composite Laminated Structure Reinforced by Inserting Pins, Method and Apparatus for Making the Same and Method for Making the Apparatus", or the like.

In the Z-pinning according to the related art as described above, the Z-pin inserted into the composite material laminated structure is mainly made of a metal material or a composite material, and an appearance of the Z-pin has a shape in which a distal end portion is sharp and a pillar portion is smooth as shown in FIG. 1 showing a Z-pin 10 according to the related art. In the Z-pinning technology, it is very important to improve coupling force between the Z-pin and the composite material into which the Z-pin is inserted. Therefore, it is more preferable that the pillar portion of the Z-pin has an unevenness shape rather than a smooth shape. However, according to the related art, since sizes of the Z-pins themselves are small and a large number of Z-pins are required, it is not easy to form unevennesses on the Z-pin while appropriately using a cheap processing scheme.

Nevertheless, when the pillar portion of the Z-pin is smoothly formed, since coupling force between the Z-pin and the composite material can not but decrease, various researches for economically forming appropriately fine unevenness parts on the Z-pin have been conducted. As a part of these researches, a technology of forming the unevenness parts on the Z-pin using a method such as a chemical corrosion method, a method of mechanically shot-peening small steelies, or the like, has been disclosed.

RELATED ART DOCUMENT

Patent Document (Patent Document 1) U.S. Pat. No. 4,808,461 (Feb. 28, 1989)
(Patent Document 2) U.S. Pat. No. 5,186,776 (Feb. 16, 1993)
(Patent Document 3) U.S. Pat. No. 5,589,015 (Dec. 31, 1996)
(Patent Document 4) U.S. Pat. No. 5,667,859 (1997)
(Patent Document 5) U.S. Pat. No. 5,800,672 (1998)
(Patent Document 6) U.S. Pat. No. 5,919,413 (1999)
(Patent Document 7) U.S. Pat. No. 6,190,602 (2001)
(Patent Document 8) U.S. Pat. No. 6,291,049 (2001)
(Patent Document 9) U.S. Pat. No. 6,405,417 (2002)
(Patent Document 10) U.S. Pat. No. 6,436,507 (2002)
(Patent Document 11) Korean Patent No. 0932302 (Dec. 8, 2009)

SUMMARY

An embodiment of the present invention is directed to providing a method of manufacturing a Z-pin having an unevenness shape formed on a surface thereof so as to economically and effectively increase coupling force in the Z-pin for coupling of a composite material laminated structure in a laminated direction, and a Z-pin manufactured using the same and a composite structure including the Z-pin.

In one general aspect, a method of manufacturing an unevenness shaped Z-pin used for Z-pinning of a composite material laminated structure, includes: forming a pillar shaped body 45 by an extruding process; press-fitting gear teeth 31 of a gear shaped press-fitting forming jig 30 of which a rotation direction is in parallel with a length direction of the body 45 into a surface of the body 45, thereby forming unevennesses 41 on the surface of the body 45; and cutting the body 45 at a predetermined length.

At least one pair of press-fitting forming jigs 30 may be disposed to face each other based on the body 45.

One pair of press-fitting forming jigs 30 may be disposed to face each other based on the body 45, thereby forming one set 35, and a plurality of sets 35 are disposed at a circumference of the body 45 and the respective sets 35 may be disposed so as to have different angles when viewed in an axial direction of the body 45. The respective sets 35 of press-fitting forming jigs 30 may be disposed to be perpendicular to each other when viewed in the axial direction of the body 45.

In the press-fitting forming jig 30, a plurality of gear teeth 31 formed on the press-fitting forming jig 30 may have the same shape or some of the plurality of gear teeth 31 formed on the press-fitting forming jig 30 may have different shapes.

In the press-fitting forming jig 30, the gear teeth 31 formed on the press-fitting forming jig 30 may have a symmetrical shape or an asymmetrical shape.

In the cutting of the body 45 at the predetermined length, the body 45 may be cut at a predetermined angle at which it is inclined with respect to the length direction of the body 45. The method may further include, after the cutting of the body 45 at the predetermined length, processing a distal end portion of the cut body 45 so as to be sharp.

In another general aspect, an unevenness shaped Z-pin is manufactured by the method as described above. The unevenness shaped Z-pin 40 may be made of a metal material or a composite material.

In another general aspect, a composite structure includes the unevenness shaped Z-pin manufactured by the method as described above. The composite structure may be made of made of polymer material.

DETAILED DESCRIPTION OF MAIN ELEMENTS

Figure 1:
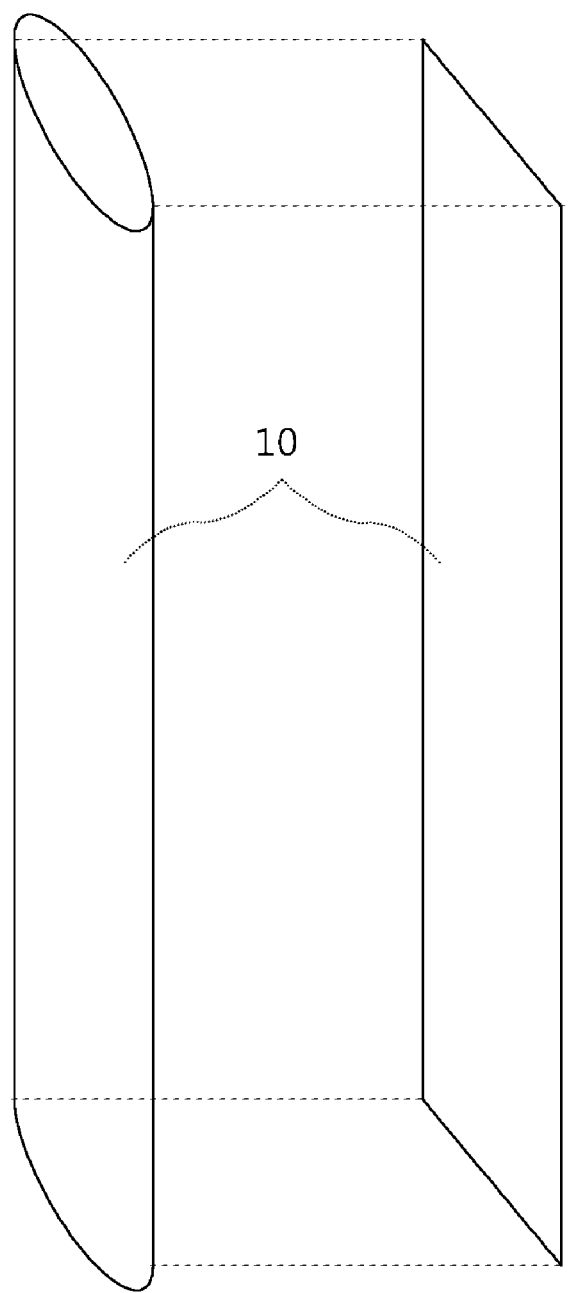
FIG. 1 is a perspective view and a side view of a Z-pin according to the related art.

10: Z-pin according to the relate art
20: Z-pin having unevenness
21: unevenness
30: press-fitting forming jig
31: gear teeth
35: press-fitting forming jig set
40: Z-pin (having an unevenness shape formed by a method of manufacturing an unevenness shaped Z-pin according to an exemplary embodiment of the present invention)
41: unevenness (formed by a method of manufacturing an unevenness shaped Z-pin according to an exemplary embodiment of the present invention)
45: body (of Z-pin having an unevenness shape formed by a method of manufacturing an unevenness shaped Z-pin according to an exemplary embodiment of the present invention)

DETAILED DESCRIPTION OF EMBODIMENTS

Hereinafter, a method of manufacturing an unevenness shaped Z-pin according to an exemplary embodiment of the present invention having the configuration as described above, and a Z-pin manufactured using the same will be described in detail with reference to the accompanying drawings.

Figure 2:
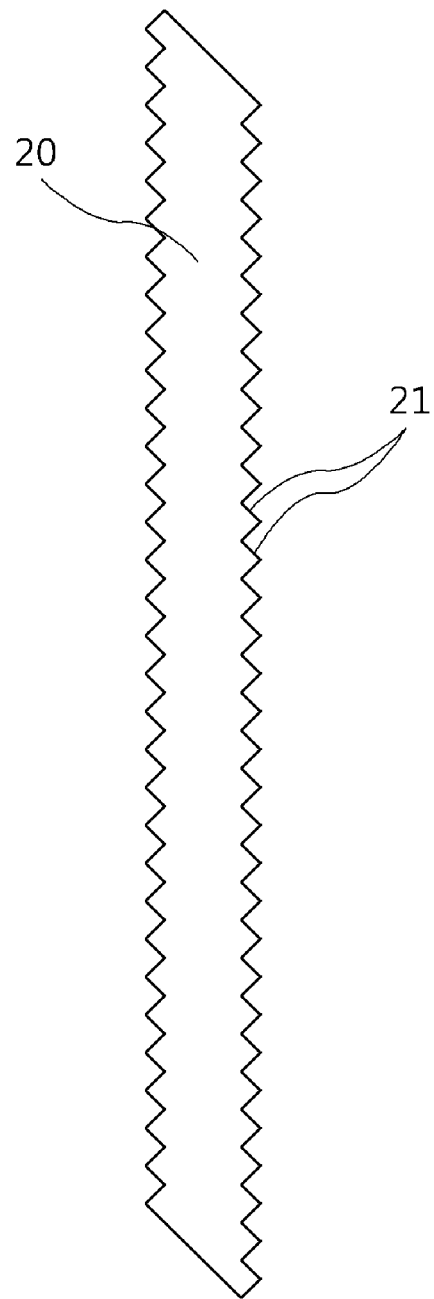
FIG. 2 is a side view of an unevenness shaped Z-pin.

As described above, a technology of inserting a Z-pin has been used in order to reinforce laminated coupling force of a composite material laminated structure in a Z direction. However, in the Z-pin 10 according to the related art as shown in FIG. 1, a distal end portion has a sharp shape and a body has a smooth pillar shape, such that coupling force between a composite material and a pin is weaker than expected coupling force. In order to solve the above-mentioned problem, it is preferable that unevennesses 21 are formed on a surface of the Z-pin 10 as shown in FIG. 2. It is obvious that post-processing for forming the unevennesses on the Z-pin 10 according to the related art having the smooth pillar shape shown in FIG. 1 is required in order to manufacture a Z-pin 20 on which the unevennesses are formed as described above.

However, generally, a diameter of the Z-pin for Z-pinning of the composite material laminated structure is about 0.5 mm, which is a significantly small size. Therefore, it is difficult to apply methods widely used when a 'mechanical component including unevennesses and having a pillar shape' is processed, for example, a cutting method of cutting a surface of the mechanical component using a tool to form an unevenness shape, a pressing working method of pressing the mechanical component with strong force using a frame to form an unevenness shape, and the like.

Meanwhile, a precision machining method such as a laser processing method, or the like, used to process the component having the small size as described above may also be applied. However, in this case, the following problems occur. A large number of Z-pins need to be used when the composite material laminated structure is manufactured. However, the precision machining method as described above requires a larger cost in installing and operating an equipment and has a relatively slower processing speed as compared with a general processing method, such that it is not appropriate for mass production. A production cost of the Z-pin is increased and a production speed of the Z-pin is decreased, such that a production cost of the composite material laminated structure, which is a final product, is increased and a production speed of the composite material laminated structure is decreased, which is very uneconomical.

Therefore, according to the related art, a method of forming unevennesses by corroding a surface of the Z-pin in a chemical scheme, a method of forming unevennesses by shooting fine steelies to collide the fine steelies with the surface of the Z-pin, or the like, has been attempted. However, these methods do not also obtain desired sufficient coupling force.

That is, in summary, the existing general mechanical component machining method such as the cutting method, the press working method, or the like, is not appropriate for processing a fine component having a size similar to that of the Z-pin, the existing precision machining method such as the laser processing method, or the like, used for processing the fine component is significantly uneconomical, such that it is also not appropriate, and newly attempted methods such as the chemical corrosion method, the steelie collision method, or the like, do not effectively form the unevennesses enough to obtain satisfactory coupling force.

Figure 3A:
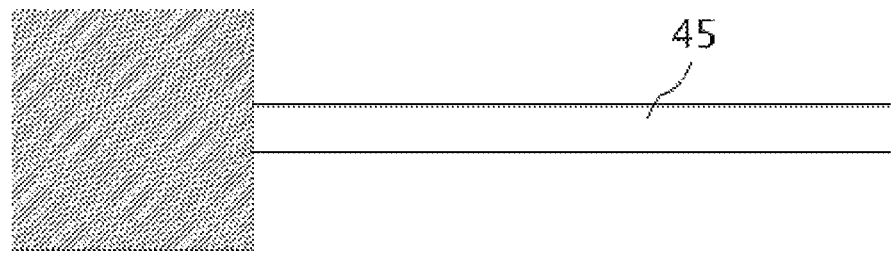
FIGS. 3A, 3B and 3C are a front view and a plan view of a method of processing an unevenness shape according to an exemplary embodiment of the present invention.
Figure 3B:
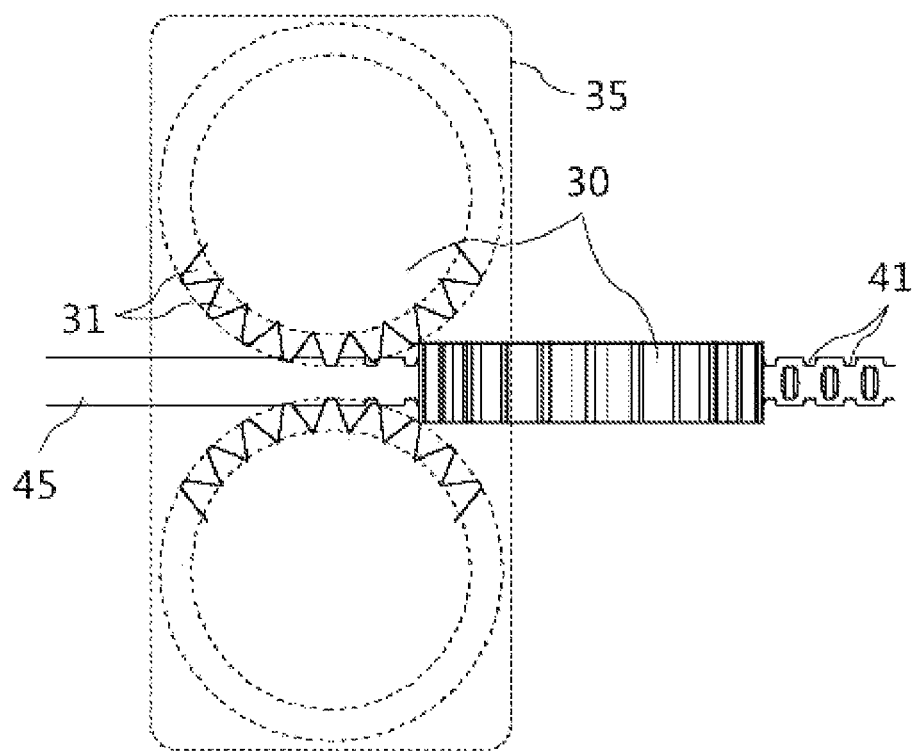
Figure 3C:
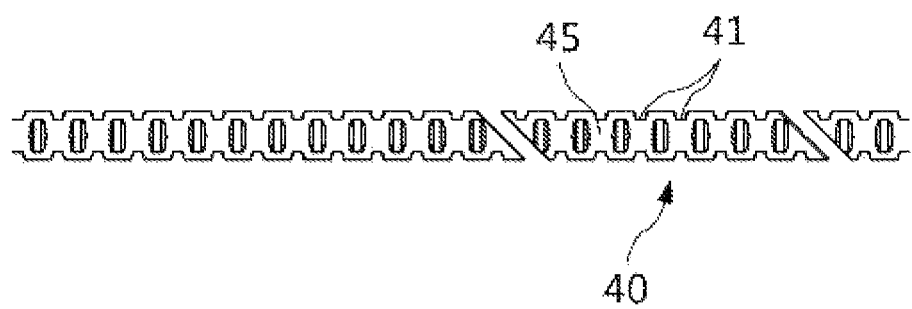
Figure 6A:
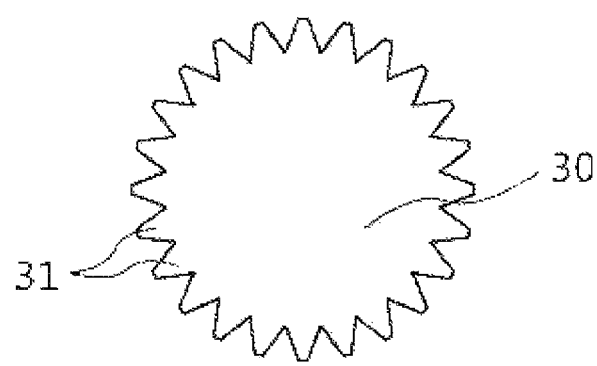
FIGS. 6A, 6B and 6C are views showing several examples of shapes of the press-fitting forming jig.
Figure 7:
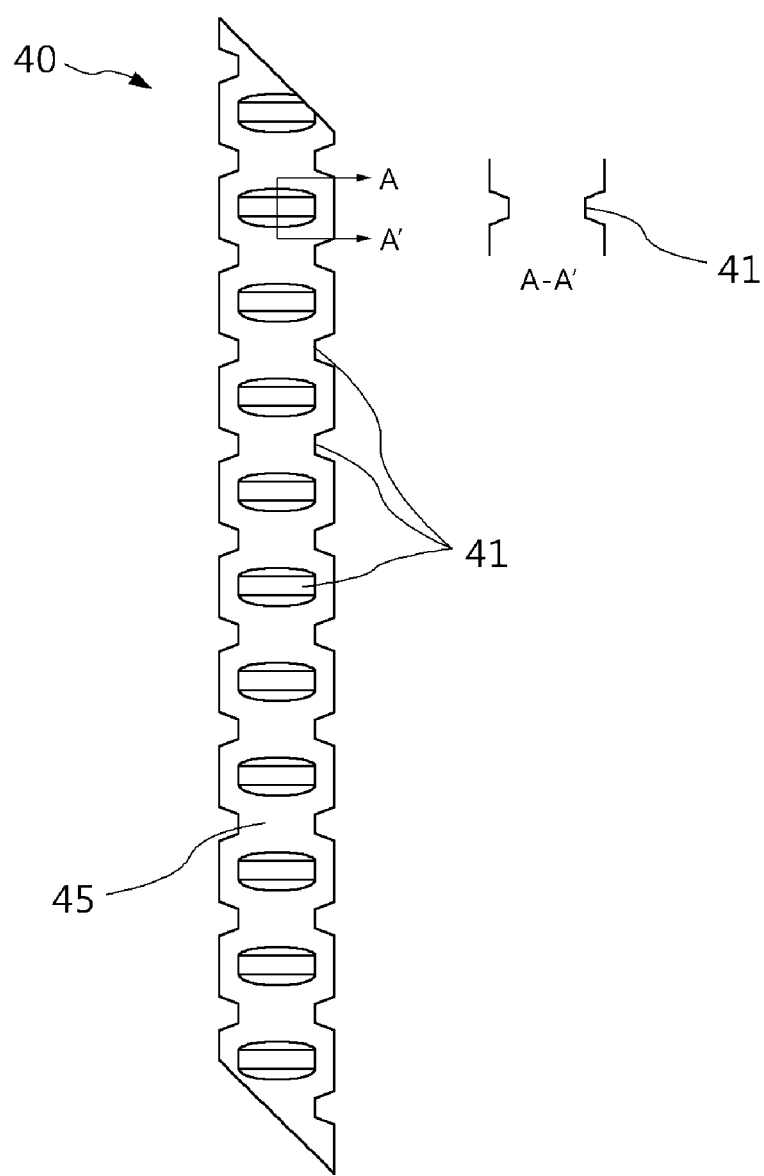
FIG. 7 is a side view of a Z-pin having an unevenness shape processed according to an exemplary embodiment of the present invention.
Figure 8:
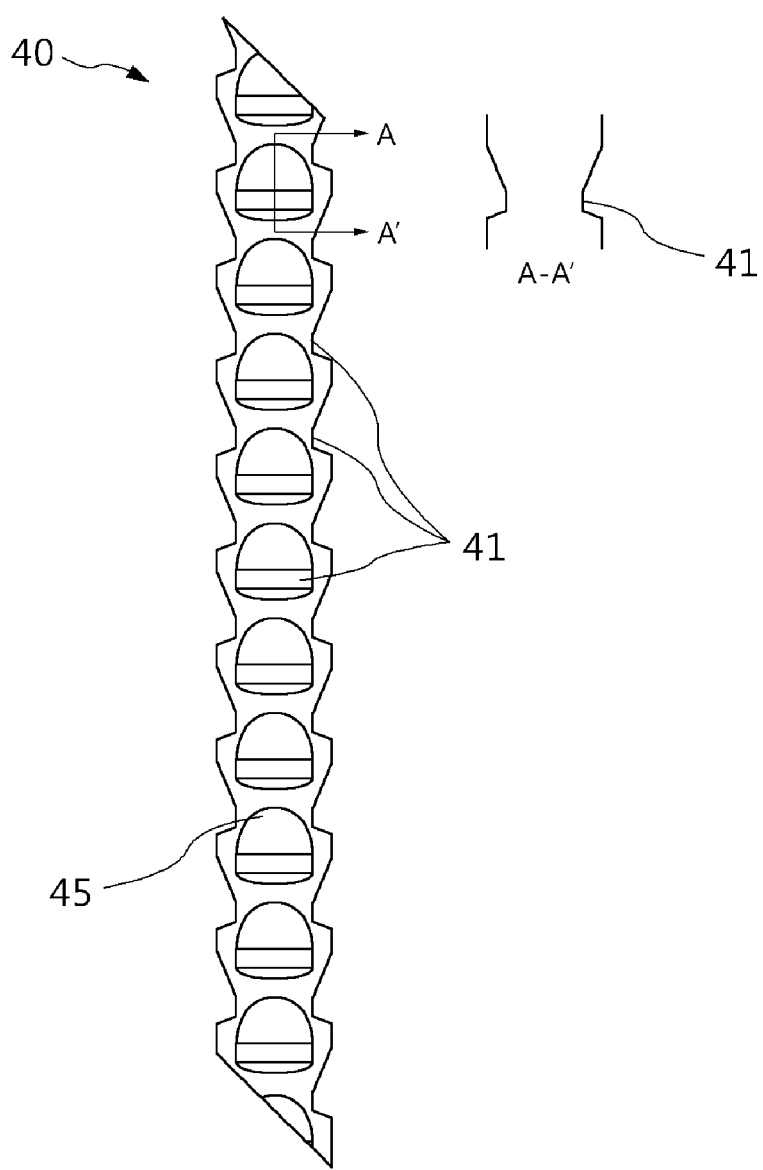
FIG. 8 is a side view of a Z-pin having an unevenness shape processed according to another exemplary embodiment of the present invention.

In the exemplary embodiment of the present invention, a method of manufacturing an unevenness shaped Z-pin capable of economically and easily forming unevennesses on a surface of a fine Z-pin by a simple method is suggested in order to solve all of these problems. FIGS. 3A to 3C are a front view and a plan view of a method of processing an unevenness shape according to an exemplary embodiment of the present invention; FIGS. 4A to 5C are views showing several examples of disposition of a press-fitting forming jig; FIG. 6A are 6C are views showing several examples of shapes of the press-fitting forming jig; FIG. 7 is a side view of a Z-pin having an unevenness shape processed according to an exemplary embodiment of the present invention; and FIG. 8 is a side view of a Z-pin having an unevenness shape processed according to another exemplary embodiment of the present invention. Hereinafter, a method of manufacturing an unevenness shaped Z-pin and a Z-pin manufactured using the same according to the exemplary embodiment of the present invention will be described in detail with reference to FIGS. 3A to 8.

The method of manufacturing an unevenness shaped Z-pin according to the exemplary embodiment of the present invention includes a body forming step, an unevenness forming step, and a cutting step, as shown in FIGS. 3A to 3C. The Z-pin manufactured using the method of manufacturing an unevenness shaped Z-pin according to the exemplary embodiment of the present invention, which is used for Z-pinning of a composite material laminated structure, is made of a metal material or a composite material so as to have strength appropriate for being inserted into the composite material laminated structure.

First, as shown in FIG. 3A, a pillar shaped body 45 is first formed by an extruding process. The extruding process is a process widely used in the case of using a shape having a single cross section using a metal material, a composite material, or the like. In the step of first forming the body 45 by the extruding process, the body 45 has a pillar shape in which a surface thereof is smooth. According to the related art, manufacture of the Z-pin is completed by cutting the body 45 at a predetermined angle and a predetermined length in this step. However, according to the exemplary embodiment of the present invention, an unevenness form-ing step to be described below is further performed, such that an evenness 41 is formed on the body 45.

Next, as shown in FIG. 3B, gear teeth 31 of a gear shaped press-fitting forming jig 30 of which a rotation direction is in parallel with a length direction of the body 45 is press-fitted into the surface of the body 45, thereby forming the unevennesses 41 on the surface of the body 45. That is, the surface of the body 45 is chopped by the gear teeth 31 of the press-fitting forming jig 30, such that the unevennesses 41 are formed on the surface of the body 45. Here, a shape of the unevenness 41 may be variously changed as desired depending on disposition of the press-fitting forming jig 30, a shape of the press-fitting forming jig 30, and the like.

Finally, as shown in FIG. 3C, the body 45 is cut at a predetermined length, such that manufacture of the Z-pin 40 is completed. Since the Z-pin 40 is used for Z-pinning of the composite material laminated structure as described above, it is preferable that a distal end portion of the Z-pin is sharp so that the Z-pin is more easily inserted into the composite material laminated structure. Here, in order to make the distal end portion of the Z-pin 40 sharp, the body 45 may be cut in the state in which it is inclined when it is cut or may be cut and be then subjected to post-processing. A description of each case will be provided below.

First, when the body 45 is cut at a predetermined length, it may be cut at a predetermined angle at which it is inclined with respect to a length direction of the body 45. In other words, when the body 45 is cut, it is not cut in a direction perpendicular to the length direction, but is cut so as to be obliquely inclined as shown in FIG. 3C. An angle at which the body 45 is inclined at the time of being cut may be appropriately determined in advance by judgment of a user depending on a material of the composite material laminated structure into which the Z-pin 40 is inserted, or the like. In addition, since a thickness of the composite material laminated structure into which the Z-pin 40 is inserted is not determined to be one, a length at which the body 45 is cut may also be appropriately determined in advance by judgment of the user. In the case in which the body is obliquely cut as described above, the distal end portion of the Z-pin has a sharp shape as shown in FIGS. 7 and 8.

Figure 9:
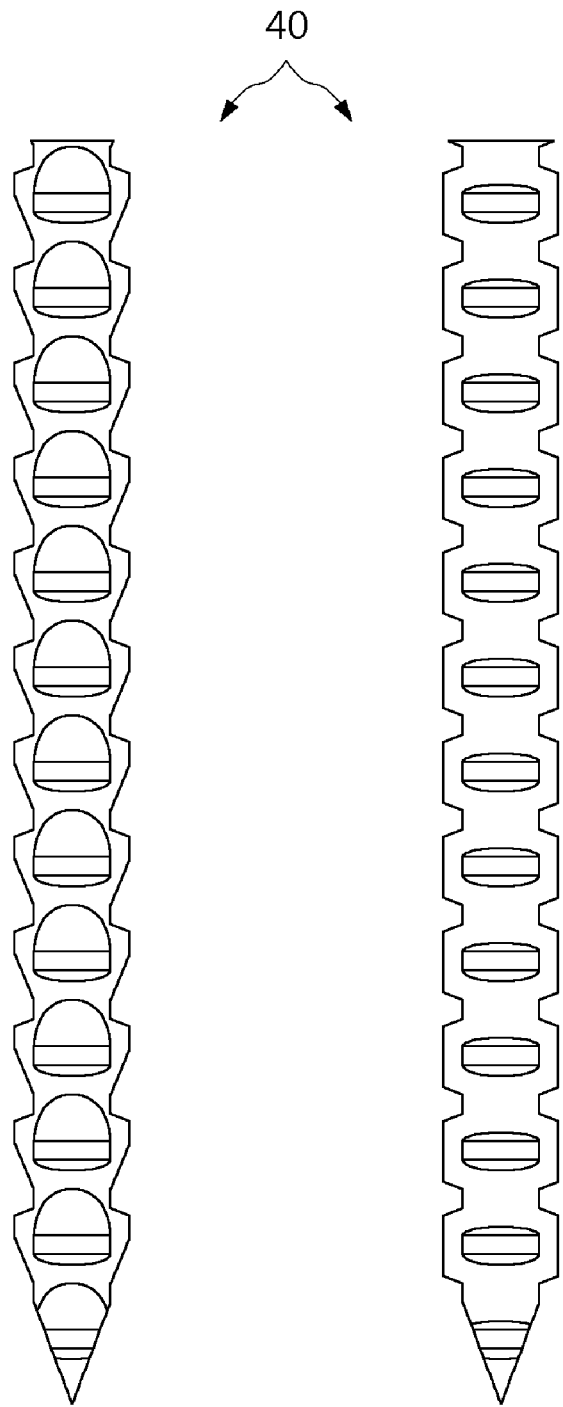
FIG. 9 is a side view of a Z-pin having an unevenness shape processed according to still another exemplary embodiment of the present invention.

Alternatively, after the body 45 is cut at the predetermined length, the distal end portion of the cut body 45 may be further processed to be sharp. In the case in which the distal end portions of the body become sharp by cutting the body part at the oblique angle as shown in FIGS. 7 and 8, the distal end portions are formed at an asymmetrical angle and both distal end portions of the Z-pin are formed to be sharp, which may be advantageous for one distal end portion to be inserted into the composite material laminated structure, but may be disadvantageous for the other distal end portion applying force for inserting the Z-pin. On the other hand, in the case in which the distal end portions become sharp by performing the post-processing as described above, one distal end portion to be inserted into the composite material laminated structure may be formed in a symmetrical shape and the other distal end portion applying the force may be formed in a flat shape, which is advantageous for applying the force. FIG. 9 shows an example of the case in which the post-processing such as cutting of the distal end portions, or the like, is performed, such that one distal end portion to be inserted into the composite material laminated structure is formed in a sharp and symmetrical shape and the other distal end portion applying the force is formed in a flat shape.

In the method of manufacturing an unevenness shaped Z-pin according to the exemplary embodiment of the present invention, it is the most important to form the unevennesses 41 on the body 45. Hereinafter, several examples of disposition and shapes of the press-fitting forming jig 30 will be described in more detail with reference to FIGS. 4A to 6C.

Figure 4A:
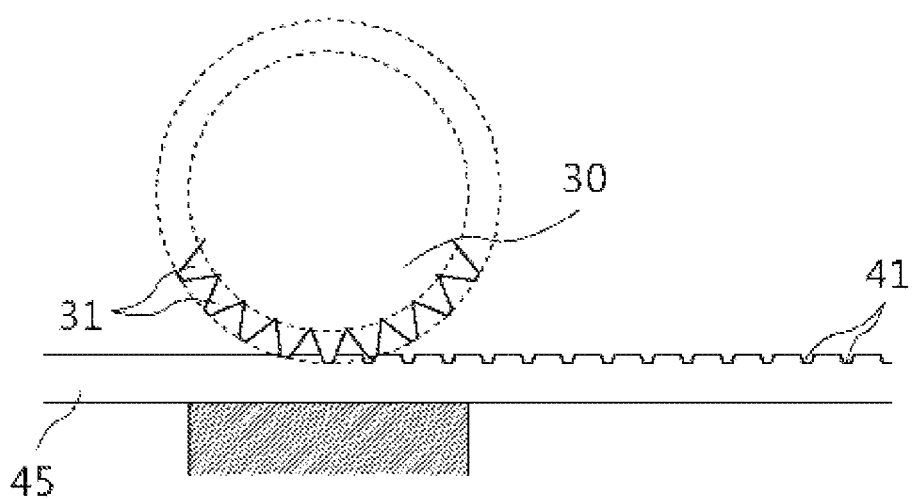
FIGS. 4A and 4B are views showing several examples of disposition of a press-fitting forming jig.

FIGS. 4A to 5C show several examples of disposition of a press-fitting forming jig. In order to form the unevennesses 41 on the Z-pin 40, most simply, as shown in FIG. 4A, a single press-fitting forming jig 30 may be disposed in the state in which a support is provided at an opposite side to the press-fitting forming jig 30 in order to support force pressing the press-fitting forming jig 30. However, in the case as shown in FIG. 4A, since the unevennesses 41 are formed only in a row, a coupling force improving effect may be asymmetrically generated. Therefore, it is more preferable that the unevennesses 41 are symmetrically formed on the Z-pin 40. That is, as shown in FIG. 4B, the press-fitting forming jigs 30 are disposed to face each other based on the body 45. In this case, a pair of press-fitting forming jigs 30 facing each other press-fits the gear teeth 31 into the body 45 of the Z-pin 40 simultaneously with supporting each other, thereby making it possible to stably form the unevennesses 41.

Figure 4B:
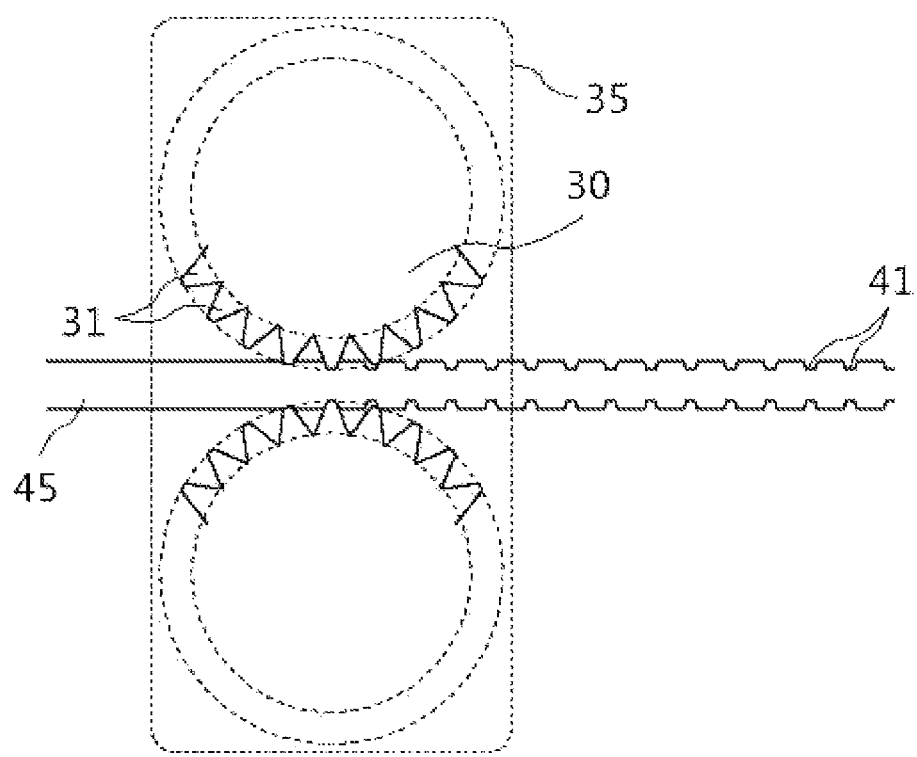
Figure 5A:
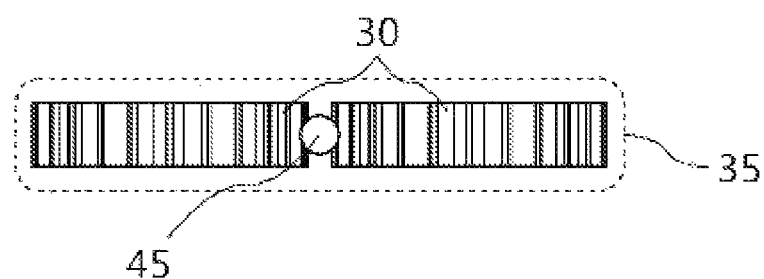
FIGS. 5A, 5B and 5C are views showing several further examples of disposition of a press-fitting forming jig.
Figure 5B:
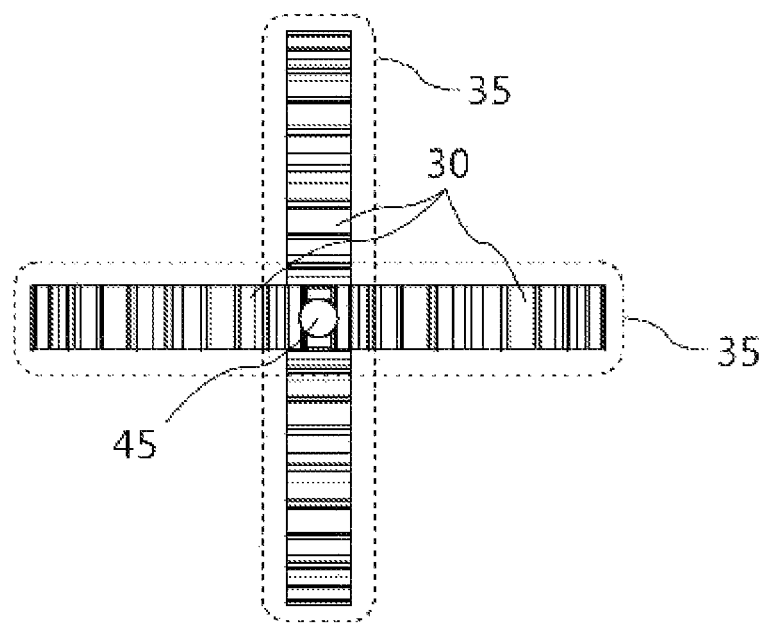
Figure 5C:
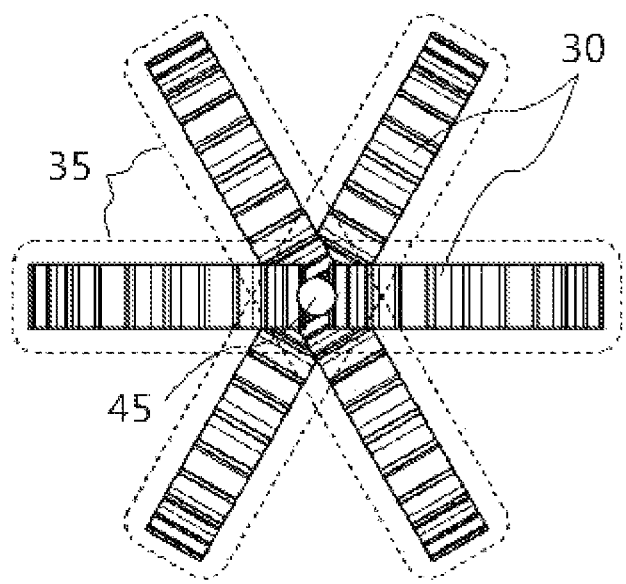

FIGS. 4A and 4B show disposition forms of the press-fitting forming jig 30, and FIGS. 5A to 5C show further improved disposition forms of the press-fitting forming jig 30. FIGS. 4A and 4B show forms viewed from a side of the body 45; however, FIGS. 5A to 5C show forms viewed from a front of the body 45. As shown in FIG. 4B, when the pair of press-fitting forming jigs 30 are disposed as a set 35 so as to face each other, only one set 35 may be disposed around the body 45 of the Z-pin 40 as shown in FIG. 5A or a plurality of sets 35 may be disposed around the body 45 of the Z-pin 40 as shown in FIGS. 5B and 5C. When the plurality of sets 35 are disposed at a circumference of the body 45 as described above, the respective sets 35 may be disposed so as to have different angles when viewed in an axial direction of the body 45, as shown in FIGS. 5B and 5C. FIGS. 5A to 5C show the case in which the number of sets 35 is 1, the case in which the number of sets 35 is 2, and the case in which the number of sets 35 is 3, respectively. When considering that the body 45 has a very small diameter of about 0.5 mm, in the case in which excessive many unevennesses 41 are formed on the body (that is, in the case in which excessive many sets 35 are disposed), strength of the finally manufactured Z-pin 40 may be decreased. Therefore, it is the most preferable that two sets 35 are disposed so as to be perpendicular to each other when viewed in the axial direction of the body 45 as shown in FIG. 5B (this form is shown in FIG. 3B).

FIGS. 6A are 6C show several examples of shapes of the press-fitting forming jig. Since the gear teeth 31 of the press-fitting forming jig 30 are press-fitted into the body 45 to form the unevennesses 41 as described above, shapes of the teeth 31 have a direct influence on those of the unevennesses 41. That is, the shapes of the gear teeth 31 of the press-fitting forming jig 30 may be variously changed depending on desired shapes of the unevennesses 41. For example, in the press-fitting forming jig 30, a plurality of gear teeth 31 formed on the press-fitting forming jig 30 may have the same shape or some of the plurality of gear teeth 31 may have different shapes. In addition, the teeth 31 may be formed in a symmetrical shape or an asymmetrical shape.

In FIG. 6A, an example of the press-fitting forming jig 30 in which all of the teeth 31 are formed in the same shape and the respective teeth 31 are formed in a symmetrical shape is shown (press-fitting forming jig 30 having this form has been shown in FIGS. 3A to 5C). FIG. 7 is a side view of a Z-pin having an unevenness shape processed according to an exemplary embodiment of the present invention. The Z-pin 40 shown in FIG. 7 is manufactured using the press-fitting forming jig 30 having the shape as shown in FIG. 6A (that is, the press-fitting forming jig 30 in which all of the teeth 31 are formed in the same shape and the respective teeth 31 are formed in the symmetrical shape). More specifically, when the press-fitting forming jigs 30 as described above are disposed as shown in FIG. 5B, the Z-pin 40 as shown in FIG. 7 having the unevennesses 41 formed in the symmetrical shape on the body 45 thereof is manufactured. In this case, when the Z-pin 40 is inserted in a vertical direction, since the unevennesses 41 themselves have a symmetrical shape in the vertical direction, stable coupling force in each direction may be obtained.

Figure 6B:
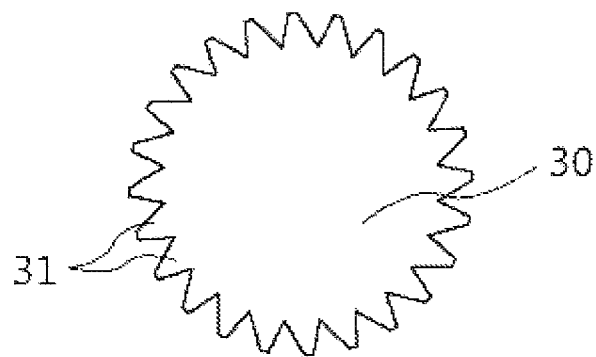

In FIG. 6B, an example of the press-fitting forming jig 30 in which all of the teeth 31 are formed in the same shape and the respective teeth 31 are formed in an asymmetrical shape is shown. FIG. 8 is a side view of a Z-pin having an unevenness shape processed according to another exemplary embodiment of the present invention. The Z-pin 40 shown in FIG. 8 is manufactured using the press-fitting forming jig 30 having the shape as shown in FIG. 6B (that is, the press-fitting forming jig 30 in which all of the teeth 31 are formed in the same shape and the respective teeth 31 are formed in the asymmetrical shape). More specifically, when the press-fitting forming jigs 30 as described above are disposed as shown in FIG. 5B, the Z-pin 40 as shown in FIG. 8 having the unevennesses 41 formed in the asymmetrical shape on the body 45 thereof is manufactured. The Z-pin having the asymmetric unevennesses as described above may be easily inserted into the composite material laminated structure and a difference in pulling force depending on an insertion direction may be applied.

Figure 6C:
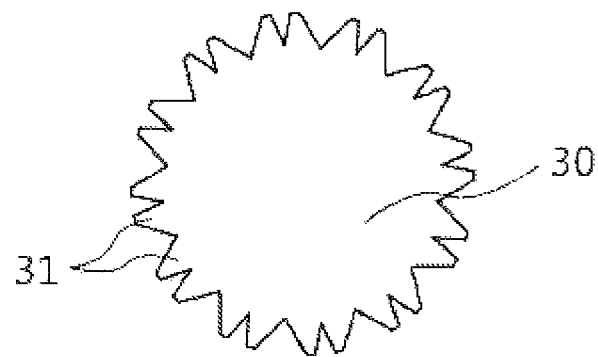

In FIG. 6C, an example of the press-fitting forming jig 30 in which some of the teeth 31 are formed in the different shapes and the respective teeth 31 are formed in an asymmetrical shape is shown. Actually, it is sufficient to use the press-fitting forming jig 30 having the shape as shown in FIG. 6A or FIG. 6B. However, in the case in which there is a special object, shapes of the teeth 31 are freely changed if necessary, thereby making it possible to appropriately change shapes of the unevennesses 41.

In addition, in the case in which several sets 35 each configured of a pair of press-fitting forming jigs 30 facing each other are disposed as shown in FIGS. 5A to 5C, and the like, the respective press-fitting forming jigs 30 may have the teeth 31 having the same shape in one set 35 or in each set 35 or may have the teeth 31 having different shapes in one set 35 or in each set 35 if necessary.

The Z-pin having the unevenness shape formed on the surface thereof by the method of manufacturing an unevenness shaped Z-pin according to the exemplary embodiment of the present invention as described above was actually applied to the Z-pinning of the composite material laminated structure, and the coupling force between the Z-pin manufactured by the method according to the related art and the composite material was primarily measured. More specifically, as a result of inserting a Z-pin having a diameter of 0.5 mm and made of stainless steel into the composite material at a depth of 10 mm and then measuring pulling force while pulling the Z-pin in the length direction of the Z-pin, coupling force was improved (about ten times or more larger) in the Z-pin that has the unevenness shape, manufactured by the by the method of manufacturing an unevenness shaped Z-pin according to the exemplary embodiment of the present invention than in a Z-pin that does not have the unevenness shape. It could be experimentally confirmed that performance was significantly improved when the Z-pinning technology of using the Z-pin having the unevenness shape formed on the surface thereof by the method of manufacturing an unevenness shaped Z-pin according to the exemplary embodiment of the present invention as described above is applied in order to improve an interlayer separation feature of the composite or improve coupling force between two members.

As described above, according to the related art, a surface treating method such as a method of cleaning and chemically corroding a surface of the Z-pin, a method of shot-peening a large number of small steelies to increase a surface area, has been used. However, according to the exemplary embodiment of the present invention, the surface of the Z-pin is mechanically press-fitted to form the unevenness shape, thereby making it possible to significantly improve performance. The method of manufacturing an unevenness shaped Z-pin according to the exemplary embodiment of the present invention may be widely used to manufacture a metal or composite Z-pin that has been used in all Z-pinning technologies researched up to now.

According to the exemplary embodiment of the present invention, in the Z-pin used for coupling of the composite material laminated structure in a laminated direction, the unevennesses are formed on the surface of the Z-pin to improve coupling force between the composite material and the pin, thereby making it possible to significantly improve coupling force of the composite material laminated structure in the laminated direction. Particularly, the shape of the unevenness formed according to the exemplary embodiment of the present invention may significantly improve the coupling force as compared with shapes of unevennesses formed by existing other methods.

Most of all, according to the exemplary embodiment of the present invention, a very effective shape capable of improving the coupling force may be economically and easily formed on the Z-pin used for the composite material laminated structure. As described above, the Z-pin has a size relatively significantly smaller than that of a component such as a general screw nail, or the like, such that it is relatively difficult to process any shape on a surface of the Z-pin. However, according to the exemplary embodiment of the present invention, since any shape may be easily and rapidly processed on the surface of the Z-pin by a simple method, a cost required for manufacturing an equipment for the processing any shape or manufacturing the Z-pin may be significantly decreased, which may be very economical.

The present invention is not limited to the above-mentioned exemplary embodiments but may be variously applied, and may be variously modified by those skilled in the art to which the present invention pertains without departing from the gist of the present invention claimed in the claims.

What is claimed is:

1. A method of manufacturing a Z-pin having an uneven surface used for Z-pinning of a composite material laminated structure, comprising:
    forming a pillar shaped body by an extruding process, the pillar shaped body having a length and a cross-section;
    preparing a gear-shaped press-fitting forming jig having gear teeth formed along a circumference of the gear-shaped press-fitting forming jig;
    pressing and rotating the gear shaped press-fitting forming jig on the pillar shaped body along a longitudinal direction thereof to form an unevenness pillar shaped body having an uneven surface, thereby forming unevenness in a surface of the pillar shaped body by the gear teeth; and
    cutting the unevenness pillar shaped body at an inclined angle with respect to the longitudinal direction thereof into a plurality of Z-pins each having the uneven surface and a predetermined length, at least one end portion of each of the Z-pins having a sharp distal end.

2. The method of claim 1, wherein the gear-shaped press-fitting forming jig includes at least one pair of press-fitting forming jigs facing each other.

3. The method of claim 1, wherein the gear-shaped press-fitting forming jig includes at least two sets of press-fitting forming jigs, each set of the press-forming jigs facing each other, the gear teeth in the press-forming jigs having different angles with respect to the longitudinal direction of the pillar shaped body.

4. The method of claim 3, wherein the at least two press-fitting forming jigs are disposed to be perpendicular to each other when viewed in the longitudianl direction of the pillar shaped body.

5. The method of claim 1, wherein the gear teeth have different shapes.

6. The method of claim 1, wherein the gear teeth have a symmetrical shape or an asymmetrical shape.

* * * * *